(12) United States Patent
Shin

(10) Patent No.: US 11,518,648 B2
(45) Date of Patent: Dec. 6, 2022

(54) ROBOT SYSTEM AND OPERATION METHOD THEREOF

(71) Applicant: LG ELECTRONICS INC., Seoul (KR)

(72) Inventor: Chang Eui Shin, Gyeonggi-do (KR)

(73) Assignee: LG ELECTRONICS INC., Seoul (KR)

(*) Notice: Subject to any disclaimer, the term of this patent is extended or adjusted under 35 U.S.C. 154(b) by 685 days.

(21) Appl. No.: 16/587,589

(22) Filed: Sep. 30, 2019

(65) Prior Publication Data
US 2020/0024104 A1 Jan. 23, 2020

(30) Foreign Application Priority Data
Aug. 16, 2019 (KR) .......................... 10-2019-0100310

(51) Int. Cl.
| | |
|---|---|
| *B25J 9/00* | (2006.01) |
| *B25J 9/16* | (2006.01) |
| *B66B 5/00* | (2006.01) |
| *B25J 19/02* | (2006.01) |

(52) U.S. Cl.
CPC ........... *B66B 5/0012* (2013.01); *B25J 9/0003* (2013.01); *B25J 9/1664* (2013.01); *B25J 9/1679* (2013.01); *B25J 9/1694* (2013.01); *B25J 9/1697* (2013.01); *B25J 19/02* (2013.01)

(58) Field of Classification Search
USPC ................ 700/245–264; 318/568.11–568.25; 187/392
See application file for complete search history.

(56) References Cited

U.S. PATENT DOCUMENTS

| | | | |
|---|---|---|---|
| 7,894,939 B2* | 2/2011 | Zini | G06K 19/0723 700/245 |
| 8,958,910 B2* | 2/2015 | Ichinose | B66B 1/2458 700/258 |
| 9,020,679 B2* | 4/2015 | Zini | G05D 1/0238 901/1 |
| 9,873,590 B2* | 1/2018 | Salmikuukka | G01C 21/206 |

(Continued)

FOREIGN PATENT DOCUMENTS

| | | |
|---|---|---|
| DE | 102021103038 A1 * | 8/2021 |
| KR | 10-2018-0075598 | 7/2018 |

(Continued)

OTHER PUBLICATIONS

Hasegawa et al, Elevator Monitoring System to Guide User's Behavior by Visualizing the State of Crowdedness. 2019, Springer, Studies in Computational Intelligence, vol. 844. pp. 85-98, https://doi.org/10.1007/978-3-030-24405-7_6 (Year: 2019).*

*Primary Examiner* — Jaime Figueroa
(74) *Attorney, Agent, or Firm* — Ked & Associates, LLP

(57) ABSTRACT

Disclosed are a robot system and an operation method thereof. The robot system includes a central controller, a robot configured to communication with the central controller and capable of autonomous driving, and a first sensing module configured to communicate with the central controller, to be mounted inside an elevator, and configured to measure an electric power of a communication radio wave emitted by a mobile communication device inside the elevator. The robot may transmit or receive a wireless signal on a mobile communication network established according to 5G communication.

20 Claims, 5 Drawing Sheets

(56) References Cited

U.S. PATENT DOCUMENTS

| | | | |
|---|---|---|---|
| 10,947,084 B2* | 3/2021 | Fang | B66B 1/3461 |
| 11,029,743 B2* | 6/2021 | Fukumoto | G06F 1/32 |
| 11,209,832 B2* | 12/2021 | Deyle | G05D 1/0214 |
| 2006/0217838 A1* | 9/2006 | Sugino | G05D 1/0251 |
| | | | 701/23 |
| 2007/0112461 A1* | 5/2007 | Zini | G05D 1/0242 |
| | | | 700/245 |
| 2012/0041593 A1* | 2/2012 | Ichinose | B66B 1/2458 |
| | | | 700/258 |
| 2015/0321881 A1* | 11/2015 | Salmikuukka | G01C 21/206 |
| | | | 187/247 |
| 2017/0312916 A1* | 11/2017 | Williams | G05D 1/0219 |
| 2018/0361585 A1* | 12/2018 | Williams | G05D 1/0282 |
| 2018/0364787 A1* | 12/2018 | Fukumoto | G01C 21/26 |
| 2019/0028997 A1* | 1/2019 | Inoue | H04W 68/12 |
| 2019/0031469 A1 | 1/2019 | Zhu et al. | |
| 2019/0062109 A1* | 2/2019 | Nanjappan | B66B 5/0056 |
| 2019/0077631 A1* | 3/2019 | Huang | B66B 5/005 |
| 2019/0352125 A1* | 11/2019 | Wooten | G05D 1/0282 |
| 2020/0061839 A1* | 2/2020 | Deyle | G06Q 10/087 |
| 2021/0046650 A1* | 2/2021 | Deyle | G06Q 10/087 |
| 2021/0046655 A1* | 2/2021 | Deyle | B25J 9/1664 |
| 2022/0075386 A1* | 3/2022 | Deyle | G06Q 10/087 |

FOREIGN PATENT DOCUMENTS

| | | |
|---|---|---|
| KR | 10-1864948 | 7/2018 |
| WO | WO-2021160623 A1 * | 8/2021 |

* cited by examiner

ROBOT SYSTEM AND OPERATION METHOD THEREOF

CROSS-REFERENCE TO RELATED APPLICATION

This present application claims priority to and the benefit of Korean Patent Application No. 10-2019-0100310, filed in Korea on Aug. 16, 2019, the entire disclosure of which is incorporated herein by reference.

BACKGROUND

1. Field

The present disclosure relates to a robot system and an operation method thereof, and more particularly, to a robot system and an operation method thereof associated with carrying a robot in an elevator.

2. Background

Services using robots are spread widely. In order to provide a convenient service to users, the robot needs to be provided to be movable. When the robot moves in a large building or structure composed of a plurality of floors, the robot needs to be provided to move to each floor by using an elevator provided in the large building or structure.

Korean Patent No. 10-1864948 discloses a method for controlling the elevator getting on and off of a mobile robot that is driven as a control unit applies a driving control signal to a robot driving unit. Korean Laid-Open Patent Publication No. 10-2018-0075598 discloses an inter-floor monitoring method when a robot boards an elevator.

When a person and a robot board together an elevator, which is a relatively narrow space, there is a fear that a person may be uncomfortable or injured by the robot. Therefore, the robot needs to determine whether to board the elevator in consideration of the size of the space inside the elevator and the number of persons in the current elevator. In a case where there are a lot of persons in the current elevator, if it is determined that the robot does not have enough space to board the current elevator, or the boarding causes inconvenience and danger to a person, the robot may consider boarding another elevator without boarding the current elevator. In such a manner, in order to determine which elevator the robot can board among a plurality of elevators installed in one place, first, it is necessary to estimate the number of persons in each of the plurality of elevators.

The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Figure 1:
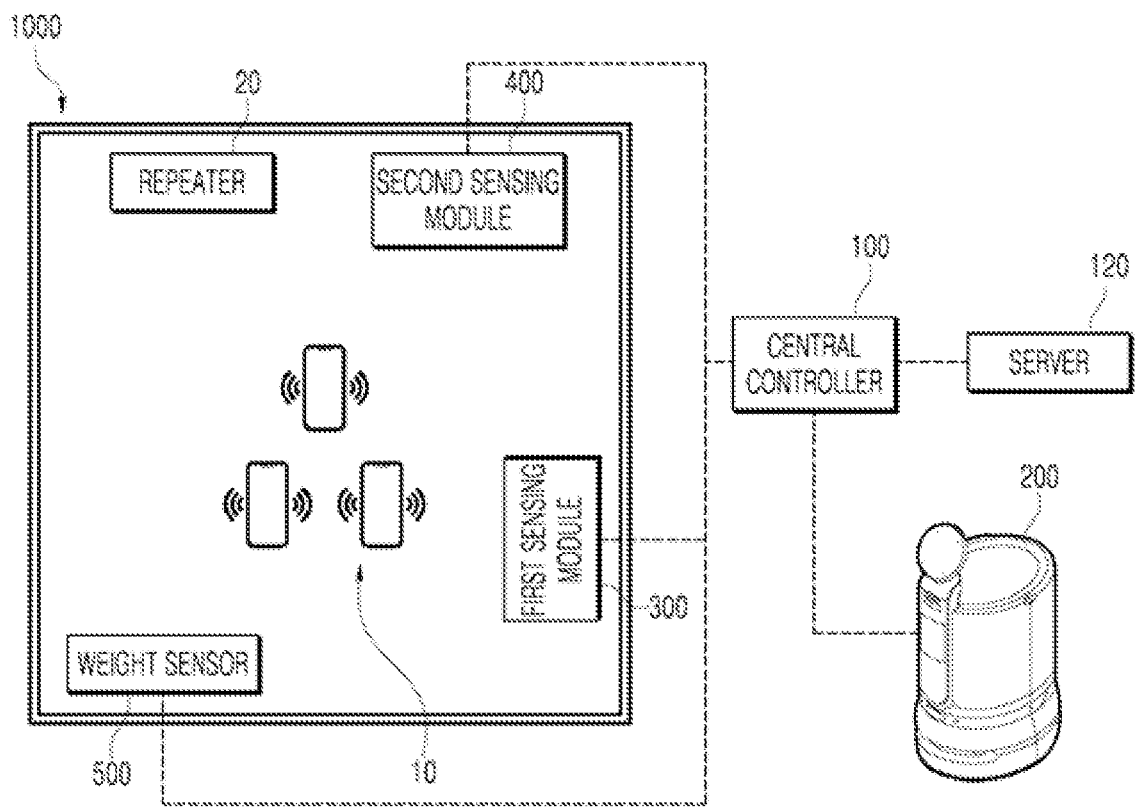
FIG. 1 is a diagram illustrating a robot system according to an embodiment of the present disclosure.

Hereinbelow, embodiments will be described in greater detail with reference to the accompanying drawings. The embodiments may be modified in various ways and may have various forms, and specific embodiments will be illustrated in the drawings and will be described in detail herein. However, this is not intended to limit the embodiments to the specific embodiments, and the embodiment should be understood as including all modifications, equivalents, and replacements that fall within the spirit and technical scope of the embodiments.

FIG. 1 is a view for explaining a robot system according to an embodiment. The robot system may include a central controller (or computing device) 100, a robot 200, a first sensing module (or first sensor) 300, a second sensing module (or second sensor) 400, and a weight sensor (or third sensor) 500. In this case, the first sensing module 300, the second sensing module 400, and the weight sensor 500 may be provided inside the elevator 1000. In addition, the second sensing module 400 may be provided when the communication operator installs the wireless communication repeater 20 inside the elevator 1000, and may not be provided when the repeater 20 is not present inside the elevator 1000.

The central controller 100 may be connected to communicate with the robot 200, the first sensing module 300, the second sensing module 400, and the weight sensor 500, may transmit and receive information to and from the robot 200, the first sensing module 300, the second sensing module 400, and the weight sensor 500, and may control them to operate the robot system.

The central controller 100 may be connected to communicate with the server, and may transmit and receive necessary information with the server. The central controller 100 may be updated by periodically receiving necessary information from the server. If the central controller 100 can be connected to communicate with the robot 200, first sensing module 300, second sensing module 400 and weight sensor 500, it may be located adjacent to the elevator 1000 or anywhere apart from the elevator 1000. In addition, the central controller 100 may be provided independent of the server, or may be integrated in the server.

In another embodiment, the central controller 100 may be provided in the robot 200 so that the robot 200 and the central controller 100 may be integrated. That is, the robot 200 of the embodiment may be provided with the central controller 100 so as to control other components by itself for the operation of the robot system.

The robot 200 may communicate with the central controller 100. The robot 200 may refer to a machine which automatically handles a given task by its own ability, or which operates autonomously. In particular, a robot 200 having a function of recognizing an environment and performing an operation according to its own judgment may be referred to as an intelligent robot 200. The robot 200 may be classified into industrial, medical, household, and military robots, according to the purpose or field of use.

The robot 200 may include an actuator or a driving unit including a motor in order to perform various physical operations, such as moving joints of the robot 200. Moreover, a movable robot 200 may include, for example, a wheel, a brake, and a propeller in the driving unit thereof, and through the driving unit may thus be capable of traveling on the ground or flying in the air. In an embodiment, the robot 200 may serve to deliver goods.

The robot 200 may autonomously drive. Autonomous driving refers to a technology in which driving is performed autonomously, and an autonomous vehicle refers to a vehicle capable of driving without manipulation of a user or with minimal manipulation of a user. For example, autonomous driving may include a technology in which a driving lane is maintained, a technology such as adaptive cruise control in which a speed is automatically adjusted, a technology in which a vehicle automatically drives along a defined route, and a technology in which a route is automatically set when a destination is set.

A vehicle includes a vehicle having only an internal combustion engine, a hybrid vehicle having both an internal combustion engine and an electric motor, and an electric vehicle having only an electric motor, and may include not only an automobile but also a train and a motorcycle. In this case, the autonomous vehicle may be the robot 200 having an autonomous driving function.

Embodiments may relate to extended reality. The eXtended Reality (XR) collectively refers to Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR. The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

The robot 200 includes a communication device, is connected to the central controller 100 or a server 120 through the communication device, receives a command from the central controller 100, obtains necessary information from the server, or receives an update. The communication device provided in the robot 200 may be configured to include at least one of a mobile communication module and a wireless internet module for communication with the central controller 100 or a server. The robot 200 may further include a near field communication (NFC) module.

The mobile communication module may transmit and receive wireless signals to and from at least one of a base station, an external terminal, and a server on a mobile communication network established according to technical standards or communication methods for mobile communications, for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), 5 generation (5G) communication and the like.

The wireless Internet module refers to a module for wireless Internet access. The wireless Internet module may be provided in the robot 200. The wireless internet module may transmit or receive wireless signals via a communication network according to wireless internet technologies.

The robot 200 may transmit and receive data to and from the server and the terminal capable of performing various communications through a 5G network. In particular, the robot 200 may perform data communications with the server and the terminal by using at least one network service among enhanced mobile broadband (eMBB), ultra-reliable and low latency communications (URLLC), and massive machine-type communications (mMTC).

eMBB (enhanced mobile broadband) is a mobile broadband service, and multimedia contents, wireless data access, etc. are provided through eMBB (enhanced mobile broadband). Further, more improved mobile services such as a hotspot and a wideband coverage for receiving mobile traffic that are tremendously increasing can be provided through eMBB. Through a hotspot, the large-volume traffic may be accommodated in an area where user mobility is low and user density is high. Through broadband coverage, a wide-range and stable wireless environment and user mobility may be guaranteed.

A URLLC (ultra-reliable and low latency communications) service defines very severer requirements than existing LTE in terms of reliability in data transmission/reception and transmission delay, and 5G services for production process automation at industrial sites, telemedicine, telesurgery, transportation, safety, etc. are representative.

mMTC (massive machine-type communications) is a service that is not sensitive to transmission delay requiring a relatively small amount of data transmission. A much larger number of terminals, such as sensors, than a general portable phone may be connected to a wireless access network by mMTC at the same time. The communication module of the terminal should be inexpensive, and there is a need for improved power efficiency and power saving technology capable of operating for years without battery replacement or recharging.

Artificial intelligence technology may be applied to the robot 200. Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like. The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method. Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The robot 200 may autonomously drive to reach a delivery destination in order to deliver the goods. The robot 200 may move using the elevator 1000. The robot 200 and also a person may board the elevator 1000. Therefore, when a person and the robot 200 board together the elevator 1000 which is a relatively narrow space, there is a fear that a person may be uncomfortable or injured by the robot 200. Therefore, the robot 200 needs to determine whether to board the elevator 1000 in consideration of the size of the space inside the elevator 1000 and the number of persons in the current elevator 1000.

In a case where there are a lot of persons in the current elevator 100, if it is determined that the robot 200 does not have enough space to board the current elevator 1000, or the boarding causes inconvenience and danger to a person, the robot 200 may consider boarding another elevator 1000 without boarding the current elevator 1000. In such a manner, in order to determine which elevator 1000 the robot 200 can board among a plurality of elevators 1000 installed in one place, first, it is necessary to estimate the number of persons in each of the plurality of elevators 1000.

For example, by using a vision sensor such as a camera, a lidar, or a radar provided in the robot 200, the number of persons in the elevator 1000 may be measured relatively accurately. However, in order to use the vision sensor, at least the door of the elevator 1000 is required to be open.

Therefore, when the vision sensor is used, the number of persons can be measured only for one elevator 1000 having a door open. Therefore, with respect to the plurality of elevators 1000 installed in one place, regardless of the door opening of the elevator 1000 and even if the robot 200 does not board the elevator 1000, it is necessary to estimate the number of persons currently boarding the plurality of elevators 1000. This is because the robot 200 may determine which of the plurality of elevators 1000 it can board based on this estimation.

Therefore, in the embodiment, in order to effectively estimate the number of persons boarding the plurality of elevators 1000 at the same time, proposed is a method of estimating the number of persons (or passengers) by estimating the number of mobile communication devices (or user devices) 10 carried by passengers. The mobile communication device 10 may correspond to any device capable of wireless communication such as a smartphone, a tablet PC, and the like, which can be carried by persons.

In an embodiment, it may be assumed that the passengers of the elevator 1000 carry the mobile communication device 10 one by one. Of course, some persons may not carry the mobile communication device 10 or carry two or more mobile communication devices 10, but this is very unusual.

Thus, according to the above assumption, even if the number of mobile communication devices 10 is estimated and the estimated number of mobile communication devices 10 is the number of occupants of the elevator 1000, it is very effective that the robot 200 estimates the number of occupants of each of the plurality of elevators 1000, makes a plan for boarding the elevators 1000 based on this, and makes determinations on this.

The first sensing module 300 may communicate with the central controller 100 and may be mounted inside the elevator 1000. The first sensing module 300 may measure the electric power (or signal strength) of the communication radio wave emitted by the one or more mobile communication devices (or user devices) 10 in the elevator 1000. The first sensing module (or first sensor) 300 may measure, for example, an electric power (or signal strength) of a communication radio wave or wireless data signal in which the mobile communication device 10 communicates with a wireless communication base station through a random access channel (RACH).

The mobile communication device 10 may periodically communicate with the wireless communication base station through the RACH. Even if the mobile communication device 10 is in a call state with another communication device, that is, the mobile communication device 10 is not wirelessly connected to another communication device for a call or data transmission or reception, the mobile communication device 10 may repeat connection and disconnection with the wireless communication base station periodically through the RACH.

For example, due to the reason that the wireless communication base station locates the mobile communication device 10 so that the mobile communication device 10 is immediately connected with another communication device, the communication between the mobile communication device 10 and the wireless communication base station through the RACH is required.

In a limited specific space such as inside the elevator 1000, the number of mobile communication devices 10 that can use the RACH at the same time may be limited. If the mobile communication device 10 exceeding the number allocated in the elevator 1000 uses the RACH, the mobile communication devices 10 exceeding the allocated number may use the same RACH by varying the access time with other mobile devices that already use the RACH.

Therefore, when measuring the electric power of the communication radio wave between the mobile communication device 10 and the wireless communication base station for a sufficient time through the RACH, the total sum of electrical energies of communication radio waves used for communication of all mobile communication devices 10 in the elevator 1000 may be measured.

A frequency band may be set for the RACH. Accordingly, the first sensing module 300 may measure the electric power of the communication radio wave existing in the set frequency band corresponding to the RACH.

Finally, regardless of the number of mobile communication devices 10 present inside the elevator 1000 and also, regardless of whether the mobile communication device 10 is in a call state, the first sensing module 300 may measure the electric power of communication radio waves of all mobile communication devices 10 in the elevator 1000 by measuring the electric power of the communication radio wave present in the frequency band corresponding to the RACH.

The second sensing module 400 may be provided when the elevator 1000 is provided with the wireless communication repeater 20 provided by a communication service provider. That is, when the elevator 1000 is provided with the wireless communication repeater 20, the robot system may further include the second sensing module 400 for measuring the electric power of the communication radio wave received by the repeater 20. The second sensing module 400 may be provided to communicate with the central controller 100.

The repeater 20 is installed in the elevator 1000 by a communication service provider to receive the communication radio wave of the mobile communication device 10 in the elevator 1000 so that the mobile communication device 10 may be connected to the wireless communication base station. The repeater 20 may receive both a communication radio wave that the mobile communication device 10 communicates through the RACH and a communication radio wave that transmits or receives a large amount of data in a call state with another communication device.

Accordingly, the second sensing module 400 may measure the electric power of the communication radio wave received by the repeater 20, and determine whether the mobile communication device 10 is inside the elevator 1000 using the measured electrical energy. In other words, when the electric power measured by the second sensing module 400 received from the second sensing module 400 is greater than or equal to a set value, the central controller 100 may determine that there is the mobile communication device 10 inside the elevator 1000 and accordingly there is a passenger in the elevator 1000. In this case, the set value of the electric power may be, for example, an electric power value of a communication radio wave when one mobile device communicates with the repeater 20 through a RACH.

When the electric power measured by the second sensing module 400 is equal to or greater than a set value, the central controller 100 may operate the first sensing module 300 to measure the electric power of the mobile communication device 10. That is, when the repeater 20 is installed in the elevator 1000, after the central controller 100 determines whether the mobile communication device 10 is inside the elevator 1000 by the second sensing module 400, only if there is the mobile communication device 10 inside the elevator 1000, the central controller 100 may operate the first sensing module 300 to estimate the number of occupants.

The weight sensor 500 may be provided in the elevator 1000 and may be provided to communicate with the central controller 100. The weight sensor 500 may measure the total weight of the person boarding the elevator 1000. For example, the weight sensor 500 may generate an electric signal when the elevator 1000 receives a load of the occupant, and may calculate the total weight of the occupant by converting the electric signal.

The weight sensor 500 may be used, for example, in machine learning to derive electric power data described below. Machine learning using the weight sensor 500 will be described in detail below. The central controller 100 may hold electric power data which is information on a change in the number of the mobile communication devices 10 according to a change in the electric power of the communication radio wave. Of course, the electric power may be measured by the first sensing module 300.

In addition, the electric power data may hold information on a change in the number of the mobile communication devices 10 according to a change in the electric power of a communication radio wave present in a frequency band corresponding to the RACH. The electric power of the communication radio wave will increase as the number of mobile communication devices 10 inside the elevator 1000 increases. The electric power data may record a value of the electric power when the number of mobile communication devices 10 is one, and a value of each electrical energy when the number of mobile communication devices 10 is two, three, and n.

The central controller 100 may estimate the number of the mobile communication devices 10 present in the elevator 1000 based on the electric power measured from the first sensing module 300 and the electric power data. The central controller 100 may estimate that the same number of persons as the number of the mobile communication devices 10 existing in the elevator 1000, which is estimated based on the electric power measured from the first sensing module 300 and the electric power data, is present in the elevator 1000. In an embodiment, the central controller 100 can easily estimate the number of occupants of each of the plurality of elevators 1000 installed in one place without using a vision sensor.

The robot 200 considers the possibility of occurrence of inconvenience or danger of the occupant based on the information on the number of occupants of the elevator 1000 estimated by the central controller 100 so as to determine whether to board the elevator 1000 or determine which elevator 1000 person is to board among the plurality of elevators 1000. Therefore, the movement of the robot 200 proceeds efficiently, and the inconvenience and risk of occupant of the elevator 1000 due to the robot 200 can be significantly reduced.

As a method for deriving and retaining the electric power data, for example, there is a test or machine learning. Hereinafter, a test and machine learning for deriving electric power data will be described in detail. By continuously performing a test or machine learning, the power and data can be updated continuously.

Figure 2:
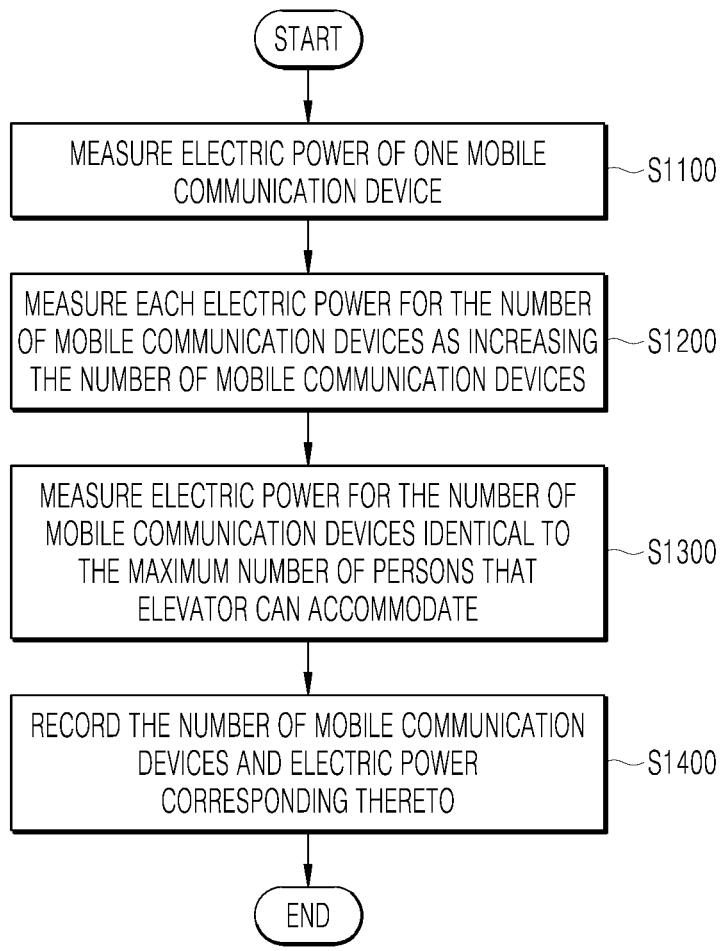
FIG. 2 is a diagram for describing a method of deriving electric power data by a test in the robot system according to an embodiment.

FIG. 2 is a diagram for describing a method of deriving electric power data by a test in the robot system according to an embodiment. In the robot system, the electric power data may be derived by a test and held by the central controller 100. The test can be performed in the elevator 1000 equipped with the first sensing module 300. The test may be performed in a method of increasing the number of the mobile communication device 10 from one to the same number as the maximum number of persons that the elevator 1000 can accommodate, and measuring and recording an electric power of a communication radio wave corresponding to the number of the mobile devices.

First, one mobile communication device 10 is placed in the elevator 1000 and the electric power of the communication radio wave of one mobile communication device 10 may be measured using the first sensing module 300 (S1100). Next, while sequentially increasing the number of mobile communication devices 10, the first sensing module 300 may measure the electric power of the communication radio wave with respect to the number of mobile communication devices 10 (S1200).

Accordingly, the electric power of the communication radio wave for each communication radio wave can be calculated for each case in which there is one mobile communication device 10 in the elevator 1000 and there are two, three, and n mobile communication devices 10 in the elevator.

Next, the first sensing module 300 may measure the electric power of the communication radio wave for the mobile communication devices of the same number as the maximum number of persons that the elevator 1000 can accommodate (S1300). The central controller 100 may record the number of mobile communication devices 10 and the corresponding electrical energy (S1400).

Through the above method, the electric power data can be calculated by recording the electric power of communication radio wave for each case in which there is one mobile communication device 10 in the elevator 1000 and there are mobile communication devices of the same number as the maximum number of persons that the elevator 100 can accommodate. The calculated electric power data may be held by the central controller 100 or the server.

The test may be performed by changing the mounting position of the first sensing module 300 in the elevator 1000. This is because the electric power of the communication radio wave measured by the first sensing module 300 may vary depending on the location of the first sensing module 300 such as the ceiling, the floor, the top or the bottom of the wall of the elevator 1000. Therefore, the electric power data may retain information on the electric power of the communication radio wave of the mobile communication device 10 and the number of mobile devices corresponding thereto according to the mounting position of the first sensing module 300 in the elevator 1000.

That is, the electric power data may retain information on the electric power of the communication radio wave of the mobile communication device 10 and the number of mobile devices corresponding thereto according to the mounting position of the first sensing module 300 in the elevator 1000. Based on the electric power data calculated and held by the test method, the central controller 100 may estimate the number of mobile communication devices 10 currently present in the elevator 1000, and may estimate that the same number of persons boarding the elevator 1000 as the estimated number.

Figure 3:
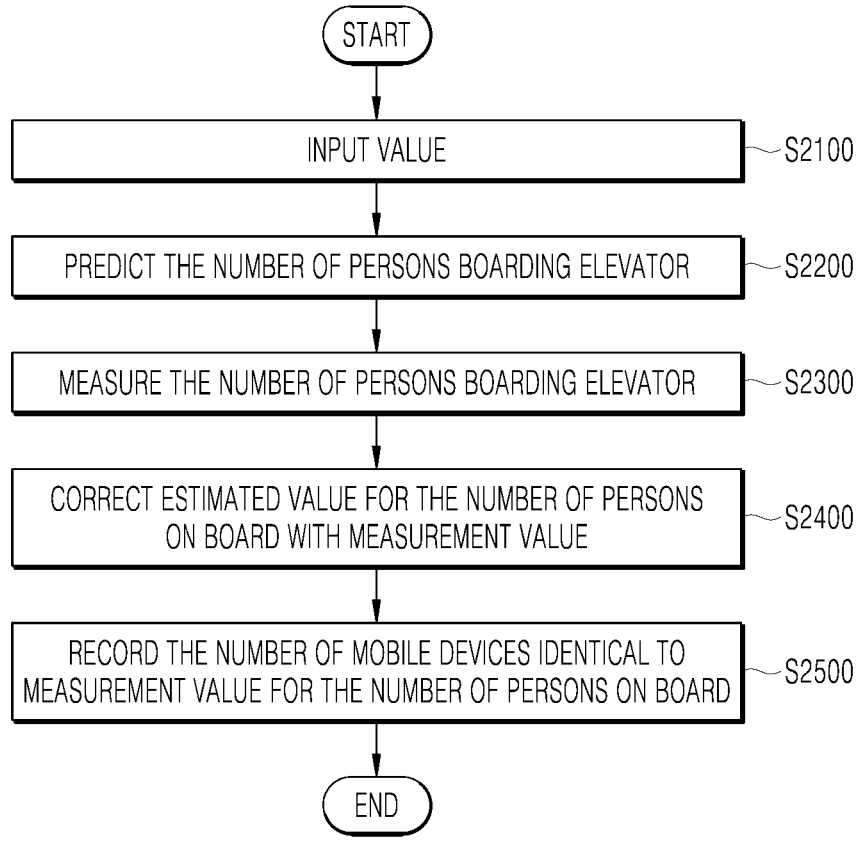
FIG. 3 is a diagram for describing a method of deriving electric power data by machine learning in the robot system according to an embodiment.

FIG. 3 is a diagram for describing a method of deriving electric power data by machine learning in the robot system according to an embodiment. For example, the machine learning may be performed in a server, and the central controller 100 may receive and retain electric power data derived by the machine learning from the server. Input values measured by the first sensing module 300 and the weight sensor 500 and required for the machine learning may be transmitted to the server through the central controller 100.

Values required for machine learning may be inputted to the server (S2100). This value, that is, the input value, may be the electric power of the communication radio wave measured by the first sensing module 300 and a total weight of persons boarding the elevator 1000 measured by the weight sensor 500 provided in the elevator 1000.

The server may estimate the number of persons in the elevator 1000 based on the inputted electrical energy of the communication radio wave and the total weight of the occupants (S2200). For example, the server may estimate the number of occupants by dividing the inputted total weight by the weight of one person. The weight of one person can be set appropriately considering the average person's weight.

The robot 200 may measure the number of occupants boarding the elevator 1000 by using a vision sensor provided therein (S2300). When the door of the elevator 1000 is opened, the robot 200 may measure the number of occupants using a vision sensor.

The server may correct the estimated value for the number of persons on board to the measured value (S2400). The server may correct the estimated value for the number of occupants expected in operation S2200 with the measured value for the number of occupants measured by the robot 200 in operation S2300. The server may record the number of mobile devices, which corresponds to the measured value for the number of occupants on board (S2500).

In the subsequent machine learning, the server may use the value corrected with the measured value as an expected value in the case of the same input value as before, and the machine learning may be continuously repeated. The electric power data calculated in this manner can hold information on the number of mobile devices for the electric power of the communication radio wave of the mobile communication device 10.

In addition, as in the case of the test, the machine learning may be performed by changing the mounting position of the first sensing module 300 in the elevator 1000. Accordingly, the electric power data derived through machine learning may retain information on the electric power of the communication radio wave of the mobile communication device 10 according to the mounting position in the elevator 1000 of the first sensing module 300 and the number of mobile devices corresponding thereto.

As continuing the above-described machine learning, it is possible to increase the accuracy of the calculated electric power data. Based on the electric power data calculated and held by the machine learning method, the central controller 100 may estimate the number of mobile communication devices 10 currently present in the elevator 1000, and may estimate that the same number of persons boarding the elevator 1000 as the estimated number.

Figure 4:
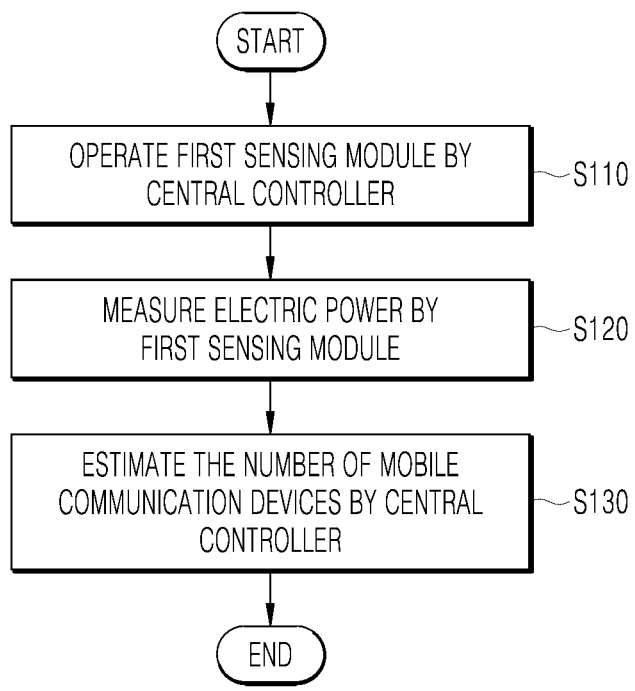
FIG. 4 is a flowchart illustrating a robot system operation method according to an embodiment.

Hereinafter, the robot system operation method will be described. In the following description, portions overlapping with the contents described above may be omitted. FIG. 4 is a flowchart illustrating a robot system operation method according to an embodiment. The embodiment shown in FIG. 4 illustrates the robot system operation method when the repeater 20 is not installed in the elevator 1000.

The central controller 100 may operate the first sensing module 300 (S110). When the robot 200 arrives at the place where the elevator 1000 is located, in order to board the elevator 1000 of the robot 200, the central controller 100 may operate the first sensing module 300. The first sensing module 300 may measure the electric power of the communication radio wave of the mobile communication device 10 existing in the elevator 1000 (S120).

The central controller 100 may estimate the number of the mobile communication devices 10 existing in the elevator 1000 from the measured electrical energy (S130). The central controller 100 may hold electric power data which is information on a change in the number of the mobile communication devices 10 according to a change in the electric power of the communication radio wave. The central controller 100 may estimate the number of the mobile communication devices 10 present in the elevator 1000 based on the electric power measured from the first sensing module 300 and the electric power data.

The central controller 100 may estimate the number of occupants of the elevator 1000 that is equal to the estimated number of mobile communication devices 10. The robot 200 receiving the information on the estimated number of occupants from the central controller 100 may determine whether to board the current elevator 1000 based on the estimated number of occupants.

Figure 5:
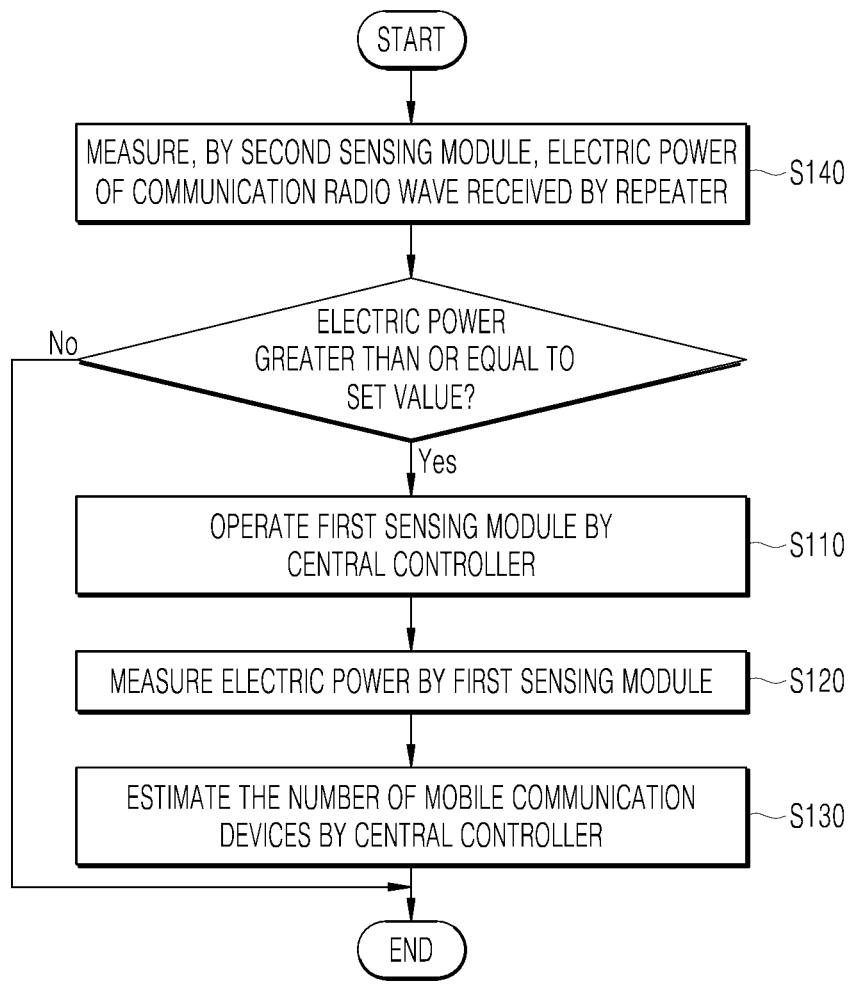
FIG. 5 is a flowchart illustrating a robot system operation method according to another embodiment.

FIG. 5 is a flowchart illustrating a robot system operation method according to another embodiment. The embodiment shown in FIG. 5 illustrates the robot system operation method when the repeater 20 is installed in the elevator 1000.

If the elevator 1000 is provided with the wireless communication repeater 20, the robot system may further include the second sensing module 400 that communicates with the central controller 100. The robot system operation method may further include measuring, by the second sensing module 400, an electric power of a communication radio wave received by the repeater 20.

As described above, when the repeater 20 is installed in the elevator 1000, the robot system may determine whether the mobile communication device 10 is inside the elevator 1000 using the second sensing module 400. At this time, after the central controller 100 determines whether the mobile communication device 10 is inside the elevator 1000 by the second sensing module 400, only if there is the mobile communication device 10 inside the elevator 1000, the central controller 100 may operate the first sensing module 300 to estimate the number of occupants.

That is, when the electric power measured by the second sensing module 400 is equal to or greater than a set value, the central controller 100 may operate the first sensing module 300 to measure the electric power of the mobile communication device 10. As described above, the set value may be, for example, an electric power value of a communication radio wave when one mobile device communicates with the repeater 20 through a RACH.

When the first sensing module 300 is operated, the above-described operations S110, S120, and S130 may be performed. If the electric power measured by the second sensing module 400 is less than the set value, since it can be estimated that there is no occupant in the elevator 1000, the central controller 100 does not operate the first sensing module 300, and the robot 200 can board the elevator 1000.

Figure 6:
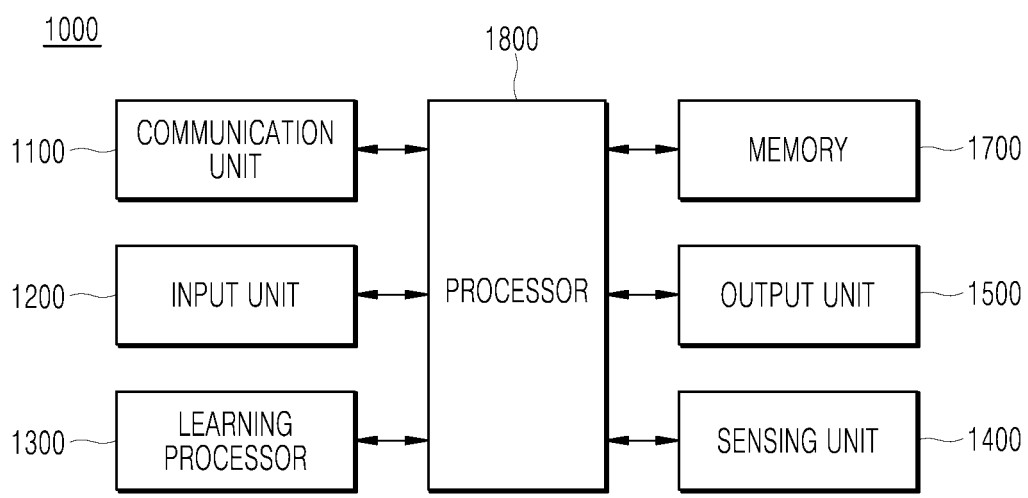
FIG. 6 illustrates an AI device according to an embodiment.

Hereinafter, an AI device, an AI server, and an AI system according to an embodiment will be described. FIG. 6 illustrates an AI device 100 according to an embodiment.

The AI device 100 may be implemented with a fixed device or a mobile device, for example, TVs, projectors, mobile phones, smartphones, desktop computers, notebooks, digital broadcasting terminals, personal digital assistants (PDAs), portable multimedia players (PMPs), navigation, tablet PCs, wearable devices, set-top boxes (STBs), DMB receivers, radios, washing machines, refrigerators, desktop computers, digital signage, robots, vehicles, and the like.

Referring to FIG. 6, the terminal 1000 may include a communication unit 1100, an input unit 1200, a running processor 1300, a sensing unit 1400, an output unit 1500, a memory 1700, and a processor 1800. The communication unit 1100 may transmit/receive data with external devices such as other AI devices 1000a to 1000e or AI server 2000 using wired or wireless communication technology. For example, the communication unit 1100 may transmit/receive sensor information, a user input, a learning model, a control signal, and the like with external devices.

In this case, the communications technology used by the communications unit 1100 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC).

The input unit 1200 may obtain various types of data. The input unit 1200 may include a camera for inputting an image signal, a microphone for receiving an audio signal, and a user input unit for receiving information inputted from a user. Here, the signal obtained from the camera or microphone may be referred to as sensing data or sensor information by treating the camera or microphone as a sensor.

The input unit 1200 may obtain, for example, learning data for model learning and input data used when output is obtained using a learning model. The input unit 1200 may obtain raw input data. In this case, the processor 1800 or the learning processor 1300 may extract an input feature by preprocessing the input data.

The learning processor 1300 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion.

The learning processor 1300 may perform AI processing together with a learning processor 2400 of the AI server 2000. The learning processor 1300 may include a memory which is combined or implemented in the AI device 1000. Alternatively, the learning processor 1300 may be implemented using the memory 1700, an external memory directly coupled to the AI device 1000, or a memory maintained in an external device.

The sensing unit 1400 may obtain at least one of internal information of the AI device 1000, surrounding environment information of the AI device 1000, or user information by using various sensors. The sensing unit 1400 may include a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (LiDAR) sensor, radar, or a combination thereof.

The output unit 1500 may generate a visual, auditory, or tactile related output. The output unit 1500 may include a display unit outputting visual information, a speaker outputting auditory information, and a haptic module outputting tactile information.

The memory 1700 may store data supporting various functions of the AI device 1000. For example, the memory 1070 may store input data, training data, training model, training history, and the like acquired by the input unit 1200.

The processor 1800 may determine at least one executable operation of the AI device 1000 based on information determined or generated by using a data analysis algorithm or a machine learning algorithm. In addition, the processor 1800 may control components of the AI device 1000 to perform the determined operation.

To this end, the processor 1800 may request, retrieve, receive, or use data of the learning processor 1300 or the memory 1700, and may control components of the apparatus 1000 to execute a predicted operation or an operation determined to be preferable of the at least one executable operation. At this time, when the linkage of the external device is necessary to perform the determined operation, the processor 1800 may generate a control signal for controlling the corresponding external device and transmit the generated control signal to the corresponding external device.

The processor 1800 obtains intent information about user input, and may determine a requirement of a user based on the obtained intent information. In this case, the processor 1800 may obtain intention information corresponding to the user input using at least one of a Speech To Text (STT) engine for converting speech input into a string or a Natural Language Processing (NLP) engine for obtaining intention information of natural language.

In an embodiment, the at least one of the STT engine or the NLP engine may be composed of artificial neural networks, some of which are trained according to a machine learning algorithm. In addition, the at least one of the STT engine or the NLP engine may be trained by the learning processor 130, trained by a learning processor 240 of an AI server 2000, or trained by distributed processing thereof.

The processor 1800 collects history information including, for example, operation contents and user feedback on an operation of the AI device 100, and stores the history information in the memory 1700 or the learning processor 1300, or transmits the history information to an external device such as an AI server 2000. The collected history information may be used to update a learning model.

The processor 1800 may control at least some of components of the AI device 1000 to drive an application stored in the memory 1700. Furthermore, the processor 1800 may operate two or more components included in the AI device 1000 in combination with each other to drive the application.

Figure 7:
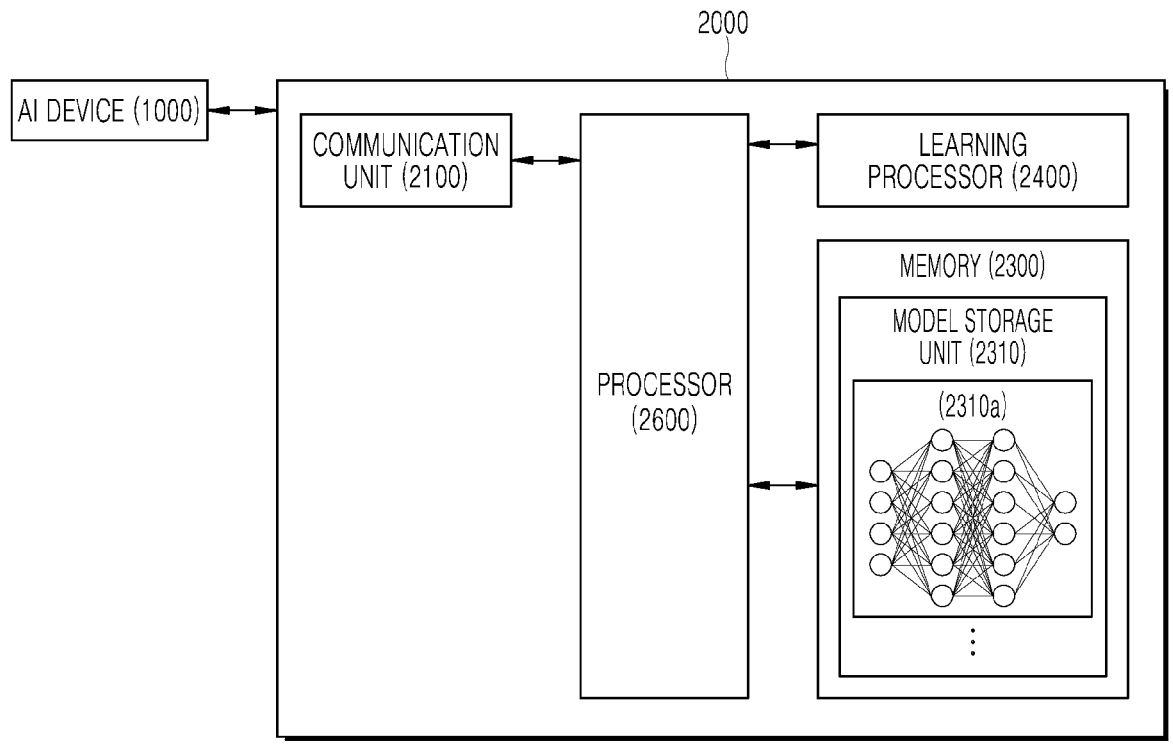
FIG. 7 illustrates an AI device according to an embodiment.

FIG. 7 is a view illustrating an AI server 2000 according to an embodiment of the present disclosure. Referring to FIG. 7, the AI server 2000 may refer to a device for training an artificial neural network using a machine learning algorithm or using a trained artificial neural network. Here, the AI server 2000 may include a plurality of servers to perform distributed processing, and may be defined as a 5G network. In this case, the AI server 2000 may be included as a configuration of a portion of the AI device 1000, and may thus perform at least a portion of the AI processing together.

The AI server 2000 may include a communications unit 2100, a memory 2300, a learning processor 2400, and a processor 2600. The communications unit 2100 may transmit and receive data with an external device such as the AI device 1000.

The memory 2300 may include a model storage unit 2310. The model storage unit 231 may store a model (or an artificial neural network 2310a) learning or learned via the learning processor 2400. The learning processor 2400 may train the artificial neural network 2310a by using learning data. The learning model may be used while mounted in the AI server 2000 of the artificial neural network, or may be used while mounted in an external device such as the AI device 1000.

The learning model may be implemented as hardware, software, or a combination of hardware and software. When a portion or the entirety of the learning model is implemented as software, one or more instructions, which constitute the learning model, may be stored in the memory 2300. The processor 2600 may infer a result value with respect to new input data by using the learning model, and generate a response or control command based on the inferred result value.

Figure 8:
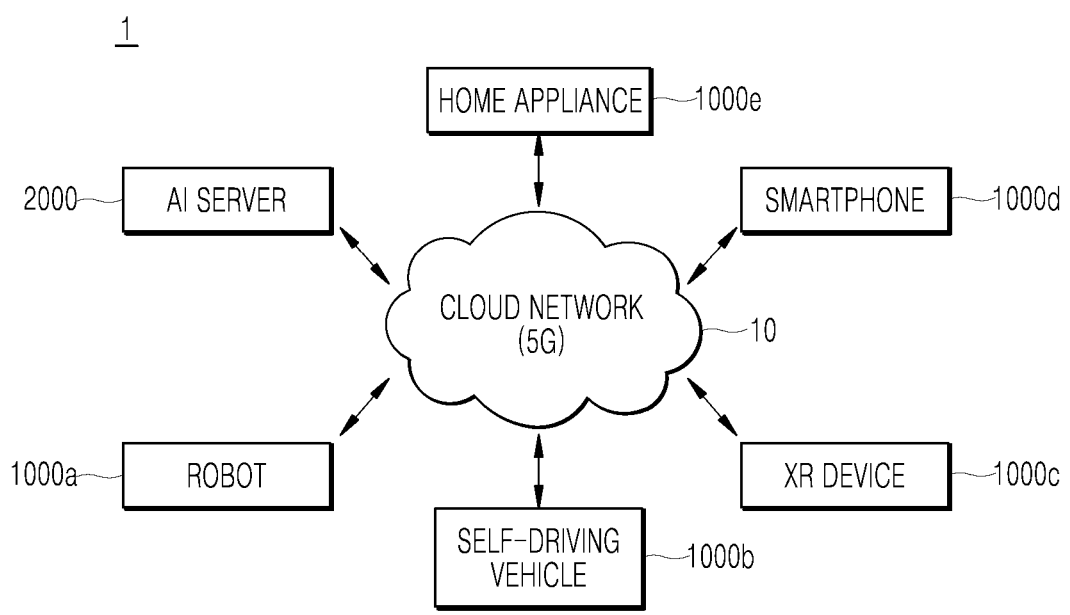
FIG. 8 illustrates an AI system according to an embodiment of the present disclosure.

FIG. 8 illustrates an AI system 1 according to an embodiment of the present disclosure. Referring to FIG. 8, in the AI system 1, at least one or more of AI server 200, robot 1000a, autonomous vehicle 1000b, XR device 1000c, smartphone 1000d, or home appliance 1000e are connected to a cloud network 10. Here, the robot 1000a, autonomous vehicle 1000b, XR device 1000c, smartphone 1000d, or home appliance 1000e to which the AI technology has been applied may be referred to as an AI device (1000a to 1000e).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network. In other words, individual devices (1000a to 1000e, 2000) constituting the AI system 1 may be connected to each other through the cloud network 10. In particular, each individual device (1000a to 1000e, 2000) may communicate with each other through the base station but may communicate directly to each other without relying on the base station.

The AI server 2000 may include a server performing AI processing and a server performing computations on big data. The AI server 2000 may be connected to at least one or more of the robot 1000a, autonomous vehicle 1000b, XR device 1000c, smartphone 1000d, or home appliance 1000e, which are AI devices constituting the AI system, through the cloud network 10 and may help at least part of AI processing conducted in the connected AI devices (1000a to 1000e).

At this time, the AI server 2000 may teach the artificial neural network according to a machine learning algorithm on behalf of the AI device (11 to 15), directly store the learning model, or transmit the learning model to the AI device (11 to 15). At this time, the AI server 2000 may receive input data from the AI device 1000a to 1000e, infer a result value from the received input data by using the learning model, generate a response or control command based on the inferred result value, and transmit the generated response or control command to the AI device 1000a to 1000e.

Similarly, the AI device 1000a to 1000e may infer a result value from the input data by employing the learning model directly and generate a response or control command based on the inferred result value. In an embodiment, the central controller can easily estimate the number of occupants of each of the plurality of elevators installed in one place without using a vision sensor.

The robot considers the possibility of occurrence of inconvenience or danger of the occupant based on the information on the number of occupants of the elevator estimated by the central controller so as to determine whether to board the elevator or determine which elevator person is to board among the plurality of elevators. Therefore, the movement of the robot proceeds efficiently, and the inconvenience and risk of occupant of the elevator due to the robot can be significantly reduced.

An aspect of the present disclosure is to provide a robot system and an operation method thereof for estimating the number of people boarding each of a plurality of elevators, which are necessary to determine which elevator a robot can board among a plurality of elevators installed in one place. Another aspect of the present disclosure is to provide data as the basis for estimating the number of persons boarding the elevator. Another aspect of the present disclosure is to provide a method of calculating the data through a test or machine learning.

According to an embodiment of the present disclosure, a robot system includes a central controller, a robot configured to communication with the central controller and capable of autonomous driving, and a first sensing module configured to communicate with the central controller, to be mounted inside an elevator, and configured to measure an electric power of a communication radio wave emitted by a mobile communication device inside the elevator.

The central controller may contain electric power data which is information on a change in the number of the mobile communication devices according to a change in an electric power of a communication radio wave, and estimate the number of mobile communication devices present in the elevator based on the electric power measured from the first sensing module and the electric power data.

The central controller may estimate that the same number of persons as the number of mobile communication devices in the elevator, which is estimated based on the electric power and the electric power data measured from the first sensing module, is present in the elevator.

The robot system may further include, when the elevator is provided with a wireless communication repeater, a second sensing module configured to measure the electric power of the communication radio wave received by the repeater, and the second sensing module may be provided to communicate with the central controller. If the electric power measured by the second sensing module is greater than or equal to a set value, the central controller may be configured to operate the first sensing module to measure the electric power of the mobile communication device.

The first sensing module may measure an electric power of a communication radio wave that the mobile communication device communicates with a wireless communication base station through a random access channel (RACH). A frequency band may be set in the RACH, and the first sensing module may measure the electric power of the communication radio wave present in the frequency band corresponding to the RACH.

The electric power data may contain information on a change in the number of mobile communication devices according to a change in electric power of a communication radio wave present in a frequency band corresponding to the RACH. The central controller may be provided in the robot.

The electric power data may be derived by a test, and as increasing the number of mobile communication devices from one to the same number as the maximum number of persons that the elevator can accommodate, the test may measure and record the electric power of the communication radio wave corresponding to the number of mobile devices. The test may be performed by changing the mounting position of the first sensing module in the elevator.

The electric power data contains information on an electric power of a communication radio wave and the corresponding number of mobile devices according to a mounting position in the elevator. The electric power data may be derived by machine learning, and the machine learning may estimate the number of persons boarding the elevator based on an input value, measure the number of persons boarding the elevator with a vision sensor provided by the robot, correct the estimated value of the number of persons on board with the measurement value, and record the number of mobile devices, which is equal to the measurement value for the number of persons on board. The input value may be an electric power measured by the first sensing module and a total weight of a person boarding the elevator measured by a weight sensor provided in the elevator.

A method of operating a robot system includes operating the first sensing module by the central controller, measuring an electric power by the first sensing module, and estimating the number of mobile communication devices present in the elevator from the electric power measured by the central controller. The central controller contains electric power data which is information on a change in the number of the mobile communication devices according to a change in an electric power of a communication radio wave, and estimates the number of mobile communication devices present in the elevator based on the electric power measured from the first sensing module and the electric power data.

The robot system may further include a second sensing module communicated with the central controller when a wireless communication repeater is provided in the elevator, the robot system operation method may further include measuring, by the second sensing module, an electric power of a communication radio wave received by the repeater, and if the electric power measured by the second sensing module is greater than or equal to a set value, the central controller may be configured to operate the first sensing module to measure the electric power of the mobile communication device.

As described above in association with embodiments, although some cases were described, other various embodiments are possible. The technical contents of the embodiments described above can be combined in various ways unless they are not compatible, so new embodiments may be correspondingly implemented.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot system comprising:
   a computing device;
   a robot configured to move autonomously; and
   a first sensor provided at an elevator, and configured to measure a strength of signals emitted by one or more user devices in the elevator,
   wherein the computing device determines a quantity of the user devices in the elevator based on the strength measured by the first sensor, and
   the robot determines whether to move into the elevator based on the quantity of the user devices in the elevator.

2. The robot system of claim 1, wherein the computing device determines a quantity of people in the elevator based on the quantity of the user devices in the elevator, the quantity of people corresponding to the quantity of the user devices in the elevator.

3. The robot system of claim 1, further comprising a signal repeater, and a second sensor configured to measure a strength of signals received by the signal repeater.

4. The robot system of claim 3, wherein the computing device is configured to activate the first sensor to measure the strength of the signals emitted by the user devices in the elevator when the strength of signals measured by the second sensor is greater than or equal to a set value.

5. The robot system of claim 1, wherein the first sensor measures a strength of signals emitted by the user devices to communicate with a wireless communication base station through a random access channel (RACH).

6. The robot system of claim 5, wherein a frequency band is set for the RACH, and
   wherein the first sensor measures the strength of signals in the frequency band set for the RACH.

7. The robot system of claim 6, wherein the computing device stores information associating quantities of the user devices with respective signal strengths or ranges of signal strengths of signals in the frequency band corresponding to the RACH, and determines the quantity of the user devices in the elevator based on the stored information.

8. The robot system of claim 1, wherein the computing device is included in the robot.

9. The robot system of claim 1, wherein the computing device is further configured to determine data identifying respective detected signal strength levels as a quantity of the user devices in the elevator increases from one to a maximum quantity of persons that the elevator can accommodate.

10. The robot system of claim 9, wherein the computing device determines the data while a mounting position of the first sensor is changed in the elevator.

11. The robot system of claim 10, wherein the data includes information identifying signal strength levels and corresponding quantity of the user devices according to the mounting position of the first sensor in the elevator.

12. The robot system of claim 1, wherein the computing device stores data associating quantities of the user devices with respective signal strengths or ranges of signal strengths, and determines the quantity of the user devices in the elevator based on comparing the strength of the signals measured by the first sensor with the respective signal strengths or ranges of signal strengths in the stored data,
   wherein the stored data is derived by machine learning,
   wherein the machine learning includes:
      estimating a quantity of persons boarding the elevator based on an input value,
      measuring an quantity of persons boarding the elevator using a vision sensor included on the robot,
      correcting the estimated quantity of persons boarding the elevator with the measured quantity of persons boarding the elevator, and
      storing information identifying a quantity of user devices corresponding to the measured quantity of persons on the elevator.

13. The robot system of claim 12, wherein the input value is a signal strength measured by the first sensor and a total weight of persons boarding the elevator measured by a weight sensor in the elevator.

14. A method of operating a robot,
   measuring an aggregate signal strength within an elevator;
   determining a quantity of user devices in the elevator based on the aggregate signal strength measured in the elevator; and
   determining whether the robot should move into the elevator based on the quantity of the user devices in the elevator.

15. The method of claim 14, wherein the aggregate signal strength within the elevator is measured by a first sensor in the elevator; and wherein the method further comprises:

determining, by a second sensor associated at a signal repeater in the elevator, whether the aggregate signal strength within the elevator is greater than a set value; and activating the first sensor to measure the aggregate signal strength within the elevator when the aggregate signal strength within the elevator is greater than or equal to the set value.

16. The method of claim 14, wherein the robot determines to not move into the elevator when more than a set quantity of user devices are present in the elevator.

17. The method of claim 14, wherein measuring the aggregate signal strength within the elevator includes measuring a strength of signals emitted by the user devices to communicate with a wireless communication base station through a random access channel (RACH).

18. The method of claim 17, wherein a frequency band is set for the RACH, and wherein aggregate signal strength is measured for signals in the frequency band set for the RACH.

19. The robot system of claim 18, wherein determining the quantity of the user devices in the elevator based on the aggregate signal strength includes:

storing information associating quantities of the user devices with respective signal strengths or ranges of signal strengths of signals in the frequency band set for the RACH, and determining the quantity of the user devices in the elevator based on comparing the aggregate signal strength to the respective signal strengths or ranges of signal strengths in the stored information.

20. The method of claim 14, further comprising:

estimating a quantity of persons on the elevator based on aggregate signal strength and a total weight of persons on the elevator;

measuring an quantity of persons boarding the elevator using a vision sensor included on the robot; and correcting the estimated quantity of persons boarding the elevator with the measured quantity of persons boarding the elevator, wherein the robot determines whether to move into the elevator based on the corrected estimated quantity of persons in the elevator.

* * * * *